United States Patent
Li et al.

(10) Patent No.: US 6,374,195 B1
(45) Date of Patent: Apr. 16, 2002

(54) SYSTEM FOR MONITORING AND TRACKING TOOL AND TOOL PERFORMANCE

(75) Inventors: Wei Li, Troy; Karen Wortham, Livonia; John A. George, Chesterfield Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/342,963

(22) Filed: Jun. 29, 1999

(51) Int. Cl.[7] .................................................. G06F 7/00
(52) U.S. Cl. ........................ 702/182; 702/183; 702/184; 702/185; 702/188
(58) Field of Search ................................ 702/33–36, 41, 702/108, 113, 114, 122, 123, 119, 155, 158, 182–185, 188, FOR 123–125, FOR 134, FOR 135, FOR 136, FOR 145, FOR 147, FOR 170, FOR 171; 700/174, 175, 176, 177, 179, 206, 236, 237; 221/1, 2, 7, 8, 13, 75, 76, 77, 102, 129, 131; 186/55, 56

(56) References Cited

U.S. PATENT DOCUMENTS

| | | | | |
|---|---|---|---|---|
| 4,956,783 A | * | 9/1990 | Teranishi et al. | 364/468 |
| 4,965,880 A | * | 10/1990 | Petitjean | 364/468 |
| 5,025,384 A | * | 6/1991 | Teranishi et al. | 364/468 |
| 5,088,045 A | * | 2/1992 | Shimanaka et al. | 364/468 |
| 5,150,288 A | * | 9/1992 | Imai et al. | 364/132 |
| 5,202,836 A | * | 4/1993 | Iida et al. | 364/468 |
| 5,205,436 A | * | 4/1993 | Savage | 221/7 |
| 5,321,619 A | * | 6/1994 | Matsuda et al. | 364/468 |
| 5,347,463 A | * | 9/1994 | Nakamura et al. | 364/478 |
| 5,652,392 A | | 7/1997 | Lawson | |
| 5,673,194 A | * | 9/1997 | Cipelletti et al. | 364/468.22 |
| 5,787,002 A | * | 7/1998 | Iwamoto et al. | 364/468.22 |
| 5,812,693 A | | 9/1998 | Burt et al. | |
| 5,867,385 A | * | 2/1999 | Brown et al. | 364/167.02 |
| 5,903,462 A | * | 5/1999 | Wagner et al. | 364/471 |

FOREIGN PATENT DOCUMENTS

JP        11272323        * 10/1999

* cited by examiner

Primary Examiner—Marc S. Hoff
Assistant Examiner—Carol S. Tsai
(74) Attorney, Agent, or Firm—Mark P. Calcaterra

(57) ABSTRACT

A method for tracking and monitoring tools in a multi-user environment is provided. The method assigns a unique identification number to each tool which permits the tool to be tracked for purposes of performing operations on the tool, such as periodic performance verification testing and/or preventative maintenance. A user programs the frequency and time at which the operation is to be periodically performed on a tool, such as performance verification testing or preventative maintenance. The method generates routes which enable the operation to be scheduled and performed on selected tools. Data collected from the operation may be uploaded, permitting the method to monitor the performance and/or operation of the tool. In a preferred embodiment, the method compares tool performance to tool operation and calculates tool set-up parameters to tune the performance of the tool to desired levels.

9 Claims, 4 Drawing Sheets

SYSTEM FOR MONITORING AND TRACKING TOOL AND TOOL PERFORMANCE

BACKGROUND OF THE INVENTION

1. Technical Field

The present invention relates generally to a system for tracking and monitoring the performance of tools in a multi-user environment and more specifically to a system which networks information from several databases to efficiently associate data to individual tools.

2. Discussion

Tool monitoring systems which monitor the repeatability of tools at an operation level are well known in the art and are commonly used in high-volume automotive factories. These systems largely function at an "operational level" as all data is correlated to the operation which is being performed, rather than to the individual tool performing the operation. This approach has several drawbacks which have not as of yet been identified by the users of such systems.

One drawback of these systems concerns the inability to track and monitor individual tools. The ramifications of this inability affect the integrity of the data collected for an operation, the ability with which the user is able to verify the performance of the tool, the capability to verify that a tool is in a desired location and the ability to perform preventative maintenance on the tool.

The integrity of the data collected for an operation is typically dependent not only on the operation of the tool, but also on the ability of the tool to impact a workpiece in a desired manner. In fastening operations for example, it is not uncommon for different tools to exhibit the same repeatability as measured on test fixtures as measured by dynamic torque checks with in-line torque transducers but have differing impacts on the workpiece due to differences in the design or control of the tool. A common example of one such difference is the speed with which the fastening tools rotate. Significant differences between the rotational speed of two tools may render the impact (i.e., performance) of a tool unacceptable. In system where only the repeatability of the tool is monitored at the operational level, the inability to track and monitor at the tool level leaves the system vulnerable to inadvertent changes in tool assignments, and thus compromises the integrity of the system since only a portion of the information relevant to the quality of the workpiece is monitored.

Another drawback concerns the cross-referencing of information between various disciplines to permit the scheduling of performance verification testing and preventative maintenance. Monitoring and tracking at an operational level does not provide a flexible and current system which permits the user to schedule selected tools for testing and/or maintenance. Tracking at the operation level requires all tools at a given operation to be tested or maintained simultaneously. Such requirements have not been found to be workable as they are highly disruptive to the production environment employing the tool. In an attempt to improve the ability with which tools are tested or maintained, manual systems are often utilized. These manual system typically required substantial duplicative data entry efforts and lacked the ability to automatically update when changes to tool assignments were made. Consequently, changes in tool assignments were not readily incorporated into the schedules for testing and/or preventative maintenance. Therefore, the act of scheduling tests and maintenance on selected tools, as well as the process of maintaining these schedules was extremely labor intensive and fraught with opportunities for error.

Yet another drawback concerns the labor and accuracy with which periodic performance verification tests are configured. Periodic performance verification tests are frequently employed to ensure that a tool is functioning in a desired manner. Configuration of the test for a given tool requires that certain base-lining information be available for use in the analysis of the test data. Examples of this base-lining information include the specification target and the upper and lower specification limits. As this information was not linked to individual tools, manual systems are typically utilized. These manual systems typically required substantial duplicative data entry efforts and lacked the ability to automatically update when changes to tool assignments or specifications were made.

Accordingly, there remains a need in the art for a system for monitoring and tracking tools in a multi-user environment that utilizes information in a network manner to track information to and monitor the location of specific tools.

SUMMARY OF THE INVENTION

It is therefore one object of the present invention to provide a system for monitoring and tracking tools in a multi-user environment that utilizes information in a network manner to track the location of specific tools and monitor information at the tool level.

It is another object of the present invention to provide a system for monitoring and tracking tools in a multi-user environment to reduce the effort associated with the scheduling of specific tools for testing and/or maintenance.

It is still another object of the present invention to provide a system for monitoring and tracking tools in a multi-user environment to permit test data to be correlated to a specific tool to permit the tool operation to be compared with the tool performance.

A tracking and monitoring system for tools in a multi-user environment is provided. The system assigns a unique identification number to each tool used in the system which permits the tool to be tracked for purposes of performing operations on the tool, such as periodic performance verification testing and/or preventative maintenance. The system user programs the frequency and time at which the operation is to be periodically performed on a tool, such as performance verification testing or preventative maintenance. The system generates routes which enable the operation to be scheduled and performed on selected tools. Data collected from the operation may be uploaded to the system, permitting the system to monitor the performance and/or operation of the tool. In a preferred embodiment, the system compares tool performance to tool operation and calculates tool set-up parameters to tune the performance of the tool to desired levels.

Additional advantages and features of the present invention will become apparent from the subsequent description and the appended claims, taken in conjunction with the accompanying drawings.

BRIEF DESCRIPTION OF THE DRAWINGS

FIG. 5 is a view of another type of tool whose impact on a workpiece may be tracked and monitored through a performance verification test having two parts.

DETAILED DESCRIPTION OF THE PREFERRED EMBODIMENT

Figure 1:
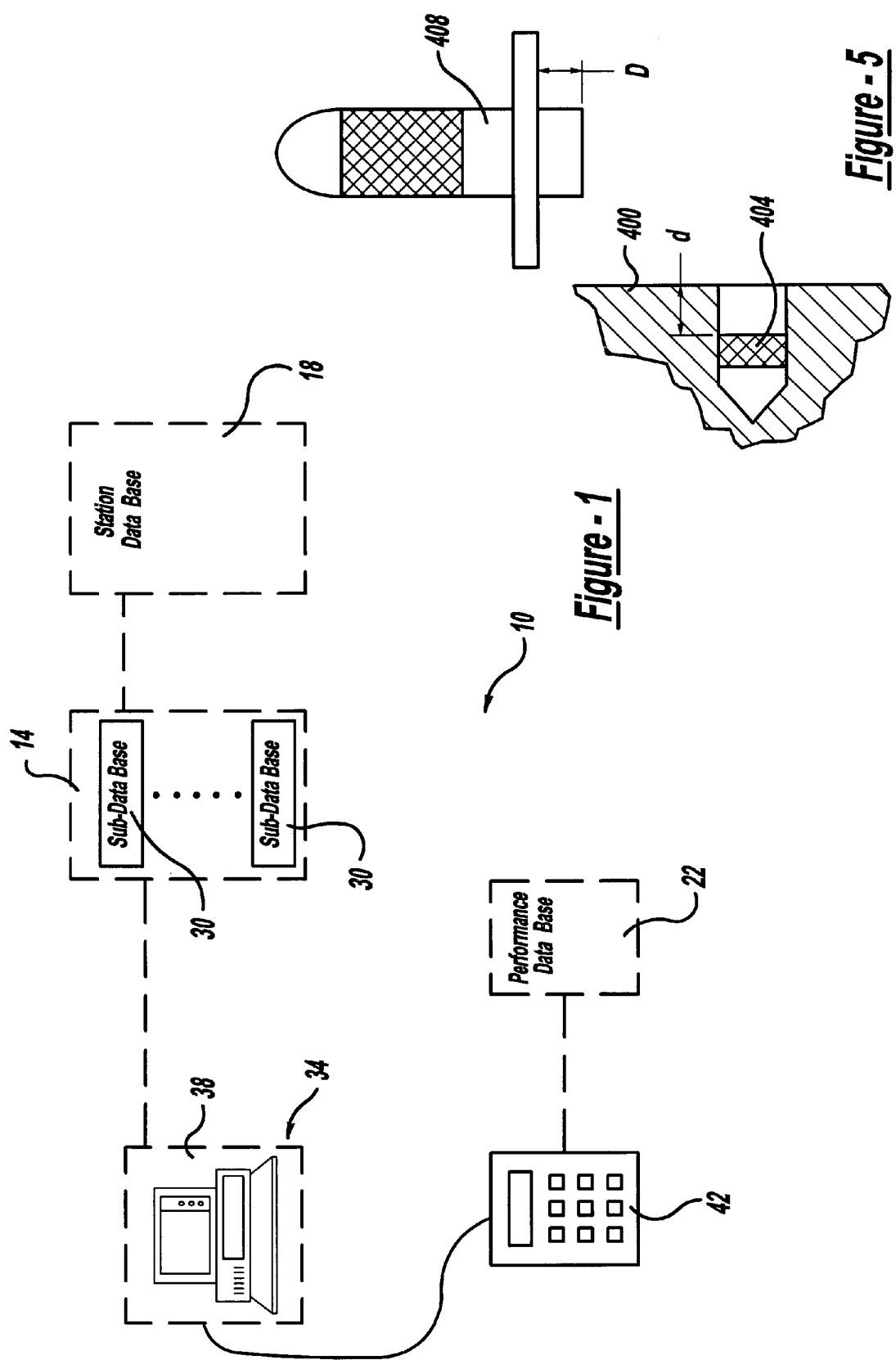
FIG. 1 is a schematic representation of the system of the present invention.

With reference to FIG. 1 of the drawings, a tool information and monitoring system according to the teachings of the present invention is generally indicated by reference numeral 10. System 10 is comprised of a plurality of databases which cooperate in a network manner to permit information regarding the assignment of a tool and its performance at given operation. In the example shown, system 10 includes a tool database 14, a station database 18, and a performance database 22.

Briefly, tool database 14 contains information related to the tool and its assignment at given operation, as well as information related to the operating parameters of the tool at that operation and the person checking out the tool. In the example illustrated, tool database 14 is operable for cross-referencing a tool to an engineering specification (e.g., torque specification), assigning the tool to a predetermined job or operation (e.g., securing a leak detection pump to a wheel house) and the physical location of the tool (e.g., department and station). Although tool database 14 may be a single comprehensive database, it is preferably comprised of a number of sub-databases 30 which permit tool database 14 to be appended over time without impacting the operation and performance of system 10. Such functionality is beneficial, for example, for planning and implementing changes associated with a new model year of a new product line. Tool database 14 is constructed utilizing commercially available software such as Microsoft Excel®, Lotus 1-2-3® or Microsoft Access®, for example, and is typically accessed at an access station 34 which may be a computer terminal 38.

Station database 18 generally contains data related to a process for periodically monitoring the performance of the tool. In the example shown, station database 18 is operable for scheduling a performance verification test for a given tool, uploading information from tool database 14 to develop a route or series of individual test matrices for predetermined tools and downloading the route to performance database 22 to permit the performance verification test to be performed on the predetermined tools. Station database 18 may also contain other data relating to the operation and maintenance of the tool, including a schedule for performing preventive maintenance on the tool. Station database 18 is constructed utilizing commercially available software such as Microsoft Access®, for example and is typically accessed at access station 34.

Performance database 22 is contained in a commercially available programmable data collection device 42, such as a TorqueStar from Crane Electronics or a DataMyte from Rockwell Automation. Once the route has been downloaded to data collection device, a portion of the route (i.e., an individual test matrix) corresponding to a desired tool is accessed and data from the performance verification test is input to data collection device and stored in the performance database 22. After data is collected for each portion of the route, the data collection device is operable for downloading the route (appended with performance database 22 so as to include all performance verification test data) to station database 18 where the data is statistically processed.

Tool database 14, station database 18 and performance database 22 cooperate in a network manner to permit the sharing of information related to a given tool, its use at a particular operation and its performance on a given operation. Accordingly, system 10 permits tracking and monitoring of a given tool, as opposed to the monitoring of a given station. Tracking and monitoring at the tool level is highly advantageous due to the ability to discern the relationship between a specific tool and the operation which it performs.

Figure 2:
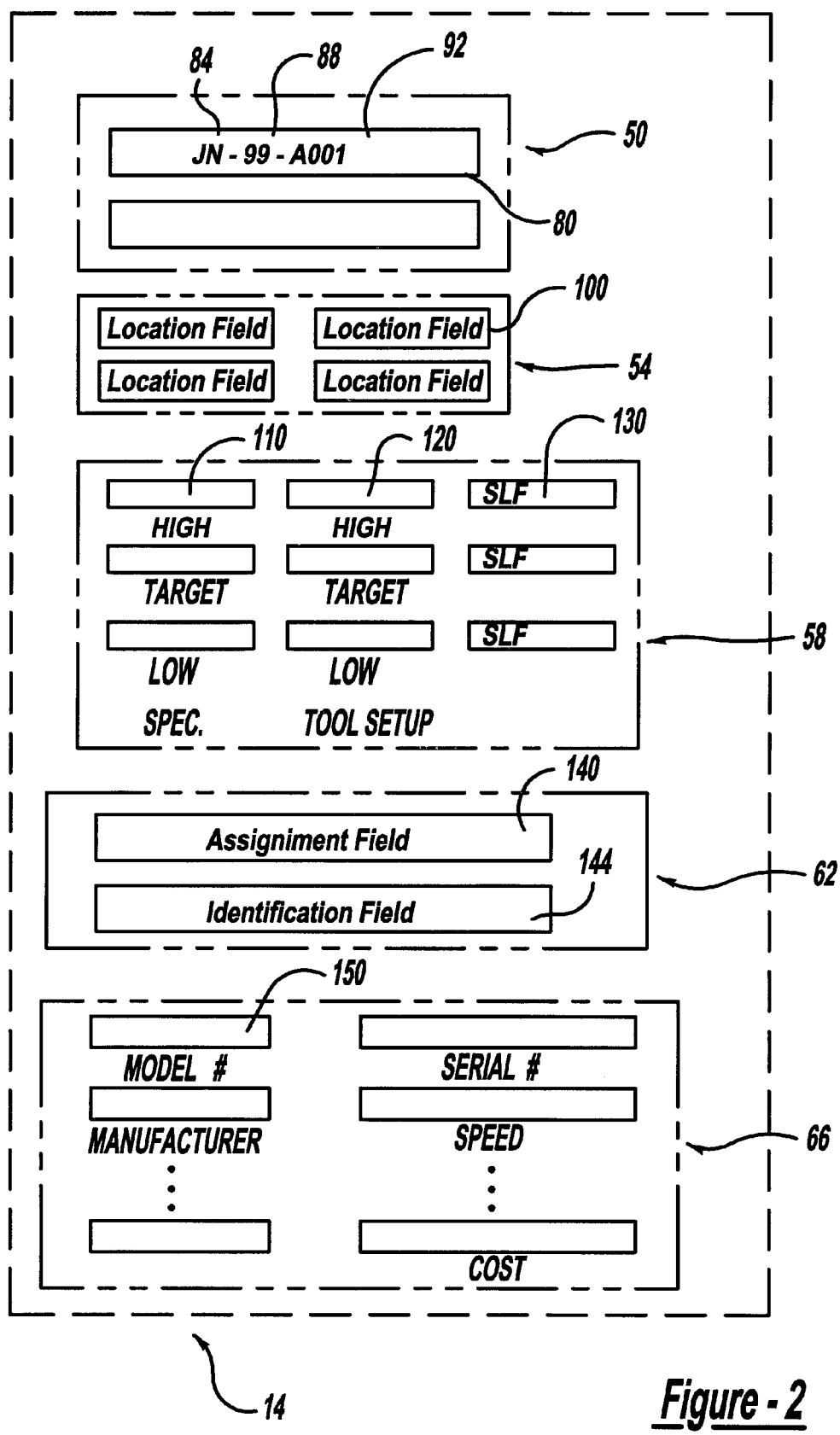
FIG. 2 is a schematic representation of the tool database according to one embodiment of the present invention.
Figure 3:
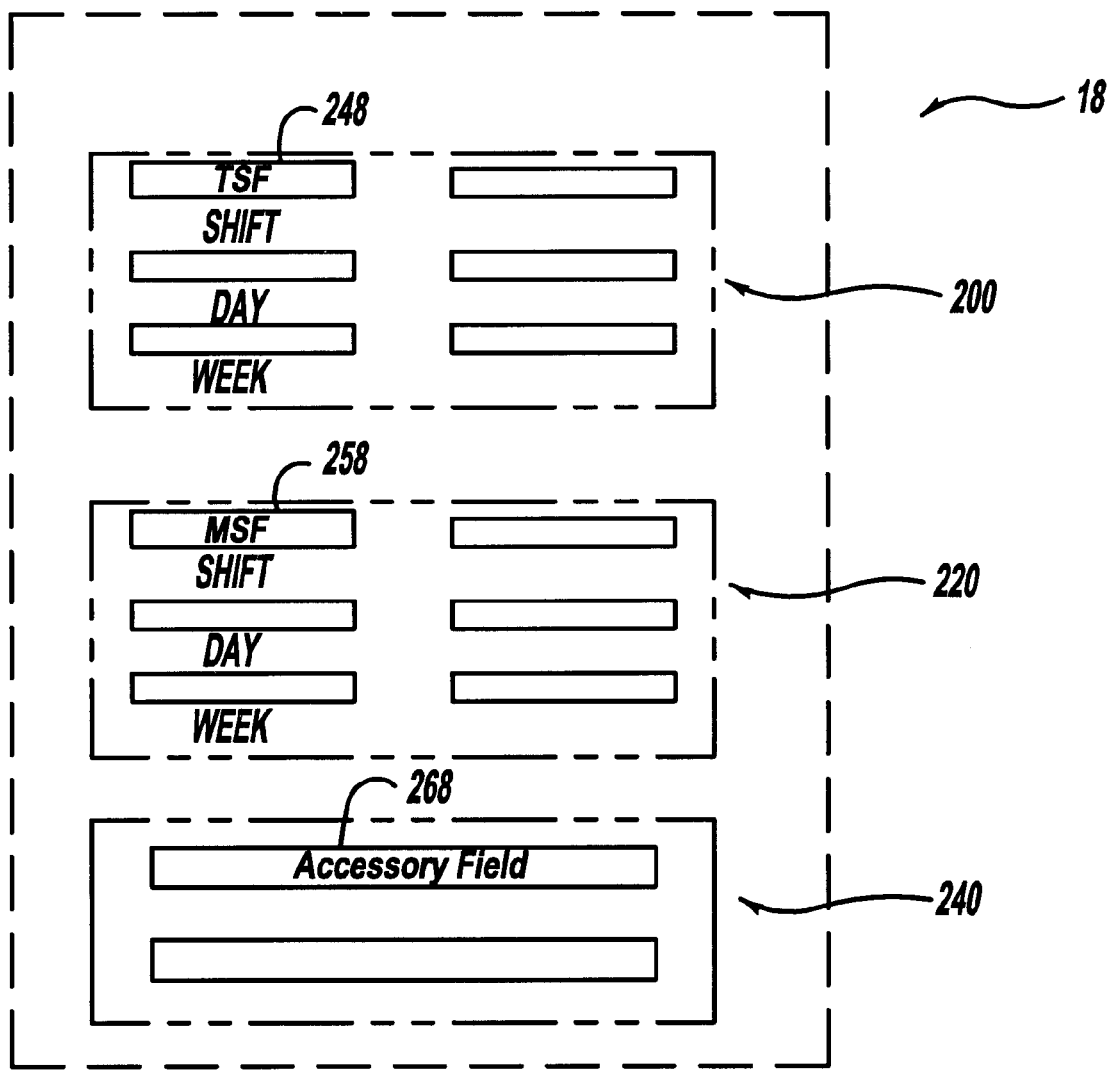
FIG. 3 is a schematic representation of the station database according to one embodiment of the present invention.
Figure 4:
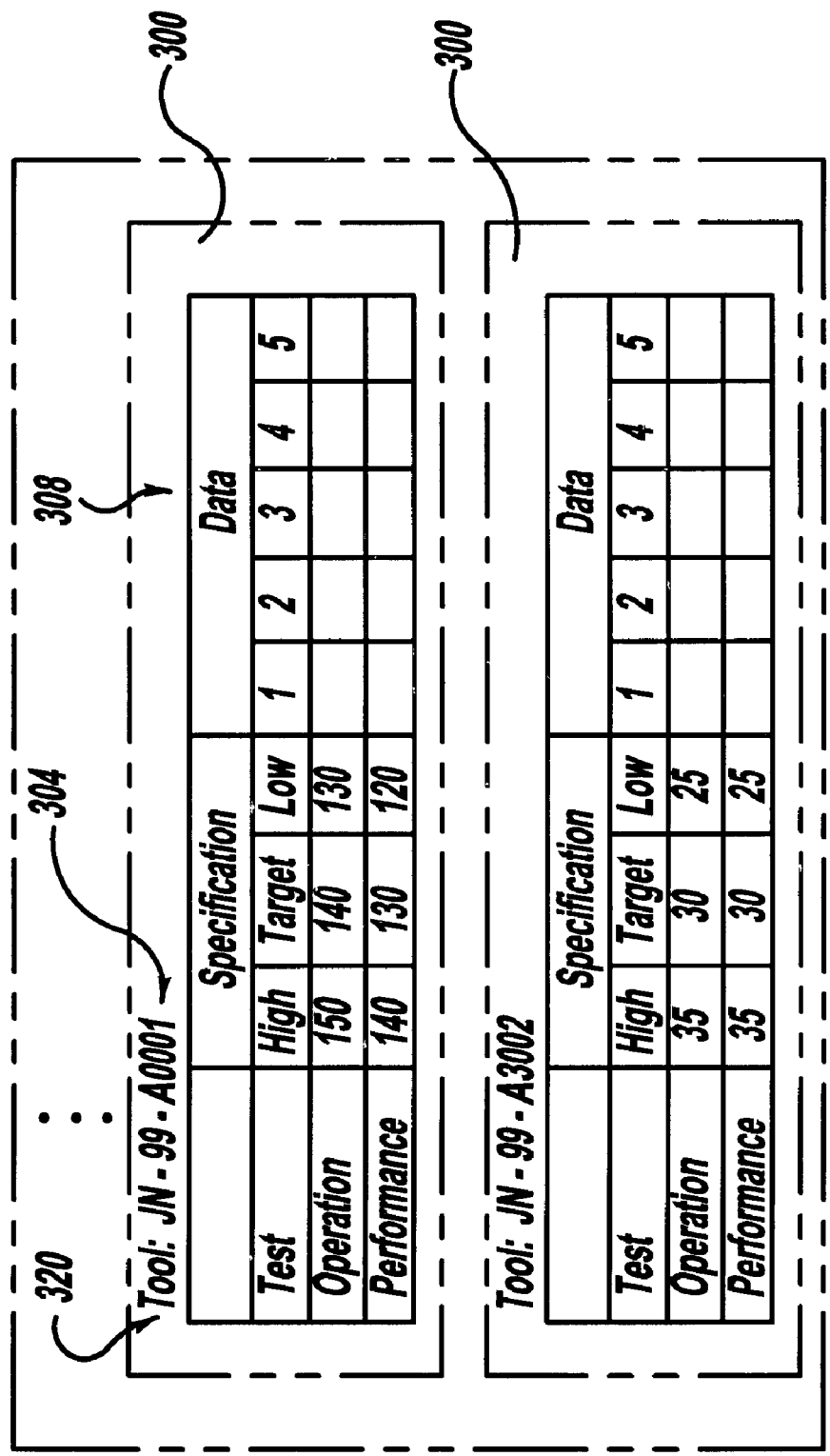
FIG. 4 is a schematic representation of a route down loaded from the station database to the performance database.

Referring now to FIGS. 2 through 4, a specific example of system 10 directed toward fastening tools is shown. In FIG. 2, tool database 14 is shown to include a tool identification portion 50, a tool location portion 54, a specification portion 58, an operation assignment portion 62 and a tool information portion 66. Tool identification portion 50 includes an alpha-numeric tool identification number 80 having a plant code 84 for identifying the plant at which the tool is used, a model year code 88 for identifying the model year in which the tool was first placed into service and an identification code 92 which essentially provides the tool with a standardized serial number within a plant and model year.

Tool location portion 54 includes one or more location fields 100 which detail the physical location of a tool within a plant. In the embodiment illustrated, up to four location fields 100 may be used to precisely identify the location of the tool. Such precision is highly desirable to improve the efficiency with which the tool is tracked for purposes of conducting performance verification testing and preventative maintenance.

Specification portion 58 is shown to preferably include one or more specification fields 110, one or more tool set-up fields 120 and one or more specification location fields 130. One skilled in the art should readily understand that the exact number of fields is dependant upon the process to be performed and the specification under which the tool is to perform. Specification fields 110 are operable for detailing the specification under which the tool is to perform. Tool set-up fields 120 are operable for detailing process specifications under which the tool is to operate. Specification location fields 130 detail the source of the specification under which the tool is to perform.

The flexibility provided by the specification and tool set-up fields 110 and 120, respectively, enables the user to adjust the operation of a tool in a manner analogous to the aiming of a rifle in high winds. When a situation is identified wherein the operation of a tool is not identical to tool performance, set-up fields 120 essentially provide a "windage" adjustment, permitting the tool to operate under alternative limits to provide a resultant (i.e., performance) which falls within the desired specification limits. Such situations routinely occur in fastening operations where the rotational input torque provided by a tool is not effectively transmitted to the fastener to produce clamping force. Factors influencing this phenomenon include the physical characteristics of the fastener (e.g., squareness of axis of threads to under side of head of fastener); the material of the members comprising the joint (e.g., steel, rubber); the use, presence and condition of lubricants, sealants, or adhesives; the rotational speed of the tool; and the physical characteristics of the joint members (e.g., flat and parallel). Those skilled in the art should realize that despite the specific reference to fastening, the above feature is also useful in many other areas, such as press or shrink-fitting operations.

Operation assignment portion 62 includes at least one assignment field 140 which cross-references the tool to a specific operation and at least one identification field 144 which identifies the person checking out the tool. Assignment field 140 is preferably a description of the operation to be performed.

However, assignment field 140 may also be an alphanumeric code which references the operation to be performed. Similarly, identification field 144 is preferably the name of the person checking out the tool and assigning it to a desired operation, but may also be a code number (e.g., employee number, badge number, personal identification number) representative of the individual.

Tool information portion 66 includes one or more tool fields 150 which permit the user to enter various information about the tool into tool database 14. Such information includes, for example, the model number, serial number and manufacturer of the tool. One skilled in the art should readily understand that the information contained in tool information portion 150 is highly dependent upon the type of tool and the type of operation which is being performed. Generally speaking, the information contained in tool information portion 150 should be detailed enough to enable one reviewing the information in tool information portion 150 to readily procure a replacement tool.

In FIG. 3, station database 18 is shown to include a performance verification scheduling portion 200, a preventative maintenance scheduling portion 220 and an accessories portion 240. As system 10 networks the various databases together, information from tool database 14 is also accessible by station database 18 for viewing or tabulating data in one or more predetermined manners.

Performance verification scheduling portion 200 includes one or more test scheduling fields 248 operable for scheduling the performance verification testing for a tool. In the embodiment illustrated, a tool is subjected to performance verification testing at a frequency of once per month and as such, the user is able to schedule performance verification testing by inputting the shift, day of the week and week of the month at which the testing is to be performed.

Similarly, preventative maintenance scheduling portion 220 includes one or more maintenance scheduling fields 258 operable for scheduling the preventative maintenance for a tool. Like performance verification testing, preventive maintenance is performed on the tool on a monthly basis in the example provided and as such, the user is able to schedule preventative maintenance by inputting the shift, day of the week and week of the month at which the maintenance is to be performed.

Tool accessory portion 240 includes one or more accessory fields 268 which detail the equipment used in conjunction with the tool. Such equipment may include, for example, sockets, drive bits, socket or drive bit adapters, socket retaining devices and acceptance markers such as stamps, ink or paint.

Information in station database 18 may be tabulated in a predetermined manner to provide the user with a wide array of information, such as a report detailing all of the tools which are scheduled for preventative maintenance on a given day. Of particular importance is the tabulation of information to automatically generate routes for performance verification testing or preventative maintenance of selected tools on a given day. A route for performance verification testing is illustrated in FIG. 4. As shown, the route for the particular embodiment includes a series of matrices 300 for several tools, wherein each matrix 300 has a tool identification portion 304, a data portion 308 and a specification portion 312.

Tool identification portion 304 has one or more tool identification fields 320 which enables a technician to readily identify the tool to be tested, as well as its location. Information contained in the tool identification fields 320 may include, for example, a description of the operation and/or the tool identification number 80. The data portion 308 of the route is initially blank or filled with invalid data when the route is downloaded to performance database 22. Data portion 304 is filled with valid data when a technician performs the desired operation. Specification portion 312 includes one or more specification fields 324 which utilizes information from specification portion 58 of tool database 14 to be accessed for statistical analysis of the test data. The exact information used in specification fields 324 is dependent upon the test performed. Those skilled in the art should readily appreciate that the content of a route may be tailored to the operation to be performed and as such, may or may not include one or more portions in addition to tool identification portion 304.

Performance database 22 is contained in a data collection device 42 as mentioned previously and is initialized when a route is downloaded from station database 18 to data collection device 42. The technician performing the performance verification testing accesses performance database 22 and is instructed as to the identity of the tool to be tested and various parameters of the test, such as the number of data points to be taken, for example.

In the particular embodiment illustrated, the performance verification test is performed in two portions: a first test portion for monitoring tool operation and a second test portion for monitoring tool performance. The monitoring of tool operation may be performed dynamically on a test or simulation joint with an in-line electronic torque transducer to monitor the output of the tool and determine the repeatability of the tool on the test joint. However, as the characteristics of the test joint almost never represent the characteristics of the actual joint on which the tool is used, tool operation is rarely determinative of tool performance.

In contrast to tool operation, tool performance provides a measurement of the effectiveness of the tool in performing the operation. In the context of fastening, methods for measuring tool performance include, for example, the ultrasonic measurement of the elongation of the fastener, direct measurement of clamping forces and measurement of residual torque (i.e., the amount of torque required to initiate rotation of the fastener as measured from a predetermined point, such as a static torque test). In the particular embodiment illustrated, tool performance is monitored through the measurement of residual torque which is preferably obtained with a device having an electronic data output.

Data is entered into data collection device 42 for each portion of the test. Preferably, the devices used to monitor tool operation and tool performance are electronically coupled to data collection device 42 to enable data from the performance verification testing to be automatically entered into performance database 22. As those skilled in the art should readily appreciate, the capabilities of data collection device 42 may not be sufficient to simultaneously support equipment for the first and second test portions. Accordingly, the performance verification testing may be broken up through the inclusion of several additional test scheduling fields 248 in station database 18 to permit the first and second test portions to be scheduled at different times.

Upon completion of the performance verification testing for all of the tools in the route, performance database 22 is then uploaded to station database 18 where the data is analyzed through one or more predetermined statistical tests. Preferably, the analysis includes a comparative analysis of tool operation and tool performance which is used as the basis for determining whether to employ the tool set-up fields 120 for a tool. In the particular embodiment illustrated, the comparative analysis calculates a ratio of tool operation to tool performance. As torque was used to measure both tool operation and tool performance, the ratio is simply the ratio of the averages of torque data of the first and second test portions of the performance verification test. If this ratio is not within a predetermined range, 0.85 to 1.15, for example, the tool set-up fields 120 for the tool are employed. The specification target, as well as the upper and lower specification limits are then multiplied by the ratio of tool operation to tool performance to obtain the tool set-up target and tool set-up upper and lower limits, respectively. Once the tool set-up fields 120 are employed, the setpoint of the tool is preferably adjusted to the tool set-up target to cause the tool to operate within the tool set-up upper and lower limits.

Those skilled in the art should understand that the tools for many other process may be monitoring through two steps to fully document the impact of the tool on a workpiece, and as such, the teachings of the present invention will not be limited in scope to the monitoring and tracking of fastening tools. Another type of tooling appropriate for the system of the present invention is illustrated in FIG. 5, for example. The operation to be performed is the plugging of a workpiece 400 with a plug 404 which is driven to a predetermined dimension "d" with a driver 408. The dimension "D" on driver 408 which at least partially determines the distance with which plug 404 is driven into workpiece 400 may need to be varied from "d" due to a number of factors, including the resilience of plug 404, the force required to insert plug 404 to depth "d" and the amount which driver 408 compresses at the force required to insert plug 404. Accordingly, a two-part performance verification test may gauge dimension "D" as well as dimension "d".

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. The method for tracking tools in a multi-user environment, including the steps of:

providing an access station;

assigning an identification number to the tool;

checking out a tool at the access station;

recording information regarding the tool, the person checking out the tool, and the job being performed;

conducting a performance verification test on the tool;

analyzing the performance of the tool; and wherein the step of analyzing the performance of the tool includes comparing the operation of the tool to the performance of the tool.

2. A method for tracking tools in a multi-user environment comprising the steps of:

providing an access station;

assigning an identification number to the tool;

recording information about the tool, the job to be performed and the specification under which the tool is to perform;

performing a first performance verification test to monitor the operation of the tool;

performing a second performance verification test to monitor the performance of the tool on the job; and monitoring a relationship between the operation of the tool and the performance of the tool.

3. The method for tracking tools in a multi-user environment of claim 2, wherein the tool is a fastening tool, the first performance verification test monitors the fastening tool dynamically and the second performance verification test monitors the residual torque on a fastener fastened by the fastening tool.

4. The method for tracking tools in a multi-user environment of claim 3, further comprising the steps of:

determining a ratio of the dynamic load to the residual load;

multiplying the ratio and a specification target to obtain a tool set-up target; and changing a setpoint of the tool to the tool set-up target.

5. The method for tracking tools in a multi-user environment of claim 2, wherein the first performance verification test monitors a linear dimension of the tool and the second performance verification test monitors an actual dimension on a workpiece related to the linear dimension.

6. The method for tracking tools in a multi-user environment of claim 5, wherein the tool is operable for pressing a component into a workpiece to a predetermined dimension and the second performance verification test monitors distance by which the component is pressed into the workpiece.

7. A method for tracking tools in a multi-user environment, including the steps of:

providing an access station;

assigning an identification number to the tool;

checking out a tool at the access station;

recording information regarding the tool, the person checking out the tool, and the job being performed;

recording the specification under which the tool is to perform;

recording process limits under which the tool is to operate;

recording information to schedule at least one operation to be performed on the tool, the at least one operation including a performance verification test;

generating a route for performing a performance verification test on the tool;

providing a programmable data collection unit;

downloading the route to program the programmable data collection unit;

conducting the performance verification test on the tool;

recording data from the performance verification test in the programmable data collection unit including the steps of:

performing a first test portion to monitor the operation of the tool;

performing a second test portion to monitor the performance of the tool on the job; and monitoring a relationship between the performance of the tool and the performance of the tool on the job.

8. The method for tracking tools in a multi-user environment of claim 7, wherein the tool is a fastening tool, the first performance verification test monitors the dynamic load of the fastening tool and the second performance verification test monitors the residual load on a fastener fastened by the fastening tool.

9. A method for tracking tools in a multi-user environment, including the steps of:

provide an access station;

assigning an identification number to the tool;

checking out a tool at the access station;

recording information regarding the tool, the person checking out the tool and the job being performed;

recording the specification under which the tool is to perform;

recording process limits under which the tool is to operate;

recording information to schedule at least one operation to be performed on the tool, the at least one operation including a performance verification test;

generating a route for performing a performance verification test on the tool;

providing a programmable data collection unit;

downloading the route to program the programmable data collection unit;

conducting the performance verification test on the tool;

recording data from the performance verification test in the programmable data collection unit; and generating a route for performing preventative maintenance on the tool.

* * * * *